United States Patent
Alani et al.

(10) Patent No.: US 6,788,098 B1
(45) Date of Patent: Sep. 7, 2004

(54) TEST STRUCTURES FOR SIMULTANEOUS SWITCHING OUTPUT (SSO) ANALYSIS

(75) Inventors: Alaa A. Alani, Hillingdon (GB); Johann Leyrer, Munich (DE); Human Boluki, Munich (DE)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/414,703

(22) Filed: Apr. 16, 2003

(51) Int. Cl.[7] .............................................. H03K 19/00
(52) U.S. Cl. .............................. 326/16; 326/21; 326/26
(58) Field of Search .............................. 326/9, 14, 15, 326/16, 21, 22, 26

(56) References Cited

U.S. PATENT DOCUMENTS 5,646,543 A * 7/1997 Rainal .......................... 326/26
6,693,436 B1 * 2/2004 Nelson ........................ 324/537

* cited by examiner

Primary Examiner—Anh Q. Tran
(74) Attorney, Agent, or Firm—Christopher P. Maiorana, P.C.

(57) ABSTRACT

An apparatus comprising a first circuit, a second circuit and a third circuit is disclosed. The first circuit may be configured to generate a plurality of intermediate signals from a data signal. Each of the intermediate signals may be switchable between (i) a common delay and (ii) one of a plurality of different staggered delays determined by a stagger signal. The a second circuit may be configured to generate a plurality of first drive signals by gating the intermediate signals with a plurality of enable signals. The a third circuit may be configured to generate a plurality of first output signals at a transmit interface of a chip by buffering the first drive signals.

20 Claims, 7 Drawing Sheets

TEST STRUCTURES FOR SIMULTANEOUS SWITCHING OUTPUT (SSO) ANALYSIS

FIELD OF THE INVENTION

The present invention relates to test structures generally and, more particularly, to a test structure for simultaneous switching output (SSO) analysis.

BACKGROUND OF THE INVENTION

Simultaneous Switching Noise (i.e., SSN or Delta I) is defined as the noise induced by the switching lines (or aggressor lines) on unswitching or quiet lines (i.e., victim lines) at a receiver-end. To ensure that no false pulses are caused as a result of high simultaneous switching output (SSO) noise, conventional designs adhere to the constraint that SSN is always below the noise margins of the receiver. The results can be used as a reference throughout the design phase of the chip, and should be re-examined whenever the user-specified conditions and structures are modified.

It would be desirable to implement a test structure for ensuring correlation between simulations and actual production silicon.

SUMMARY OF THE INVENTION

The present invention concerns an apparatus comprising a first circuit, a second circuit and a third circuit. The first circuit may be configured to generate a plurality of intermediate signals from a data signal. Each of the intermediate signals may be switchable between (i) a common delay and (ii) one of a plurality of staggered delays determined by a stagger signal. The a second circuit may be configured to generate a plurality of first drive signals by gating the intermediate signals with a plurality of enable signals. The third circuit may be configured to generate a plurality of first output signals at a transmit interface of a chip by buffering the first drive signals.

The objects, features and advantages of the present invention include providing a test structures for simultaneous switching output (SSO) analysis that may (i) provide a flexible modular design which may be used for any type of technology, buffer, and/or package with little or no additional design overhead, (ii) provide extendability where the number of buffers in each SSO group can be easily extended to higher numbers without significant changes to the controller or any other circuits involved and where the number of buffers may be extended by adding more I/O buffers and increasing the capacity of the demultiplexer, (iii) provide simplicity by implementing (a) internal logic in a regular pattern that is easy to implement, (b) a design where not all lines from the output buffers of the transmitting chip may be connected to the receiving chip, and (c) a sample of two switching lines that may be adequate to perform Excess Incremental Delay (EID) and noise margin measurements to simplify the board design process and reduce board size, (iv) implement controllability since most of the variables (e.g., buffer type, number of switching buffers, frequency and voltage supply) may be controlled by the test engineer which enables the user to investigate the effects of these parameters on SSO noise easily, (v) implement two quiet lines in each SSO group to offer a simple and straight forward measurement of ground bounce and power droop, (vi) terminate most of the switching lines appropriately, close to the transmitting chip to reduce the complexity of the board design and save real estate on board, (vii) switch one line per buffer type to measure the noise margin of the receiver where the same line has a switch to enable the selection of a transmitted signal (from transmitting chip) or an external ramp or DC signal to be applied to the receiver, (viii) provide test or measurement points on the quiet lines that are placed as close as possible to the receiver pin such that the noise measured on these test points would have the same level at the input of the receiver, (ix) be applied to the test point on the reference line, where Excess Incremental Delay (EID) is measure for varying numbers of simultaneously switching buffers, and/or (x) implement two or more packages that can be used with the same design such that their parasitics can be easily evaluated and their performance compared.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
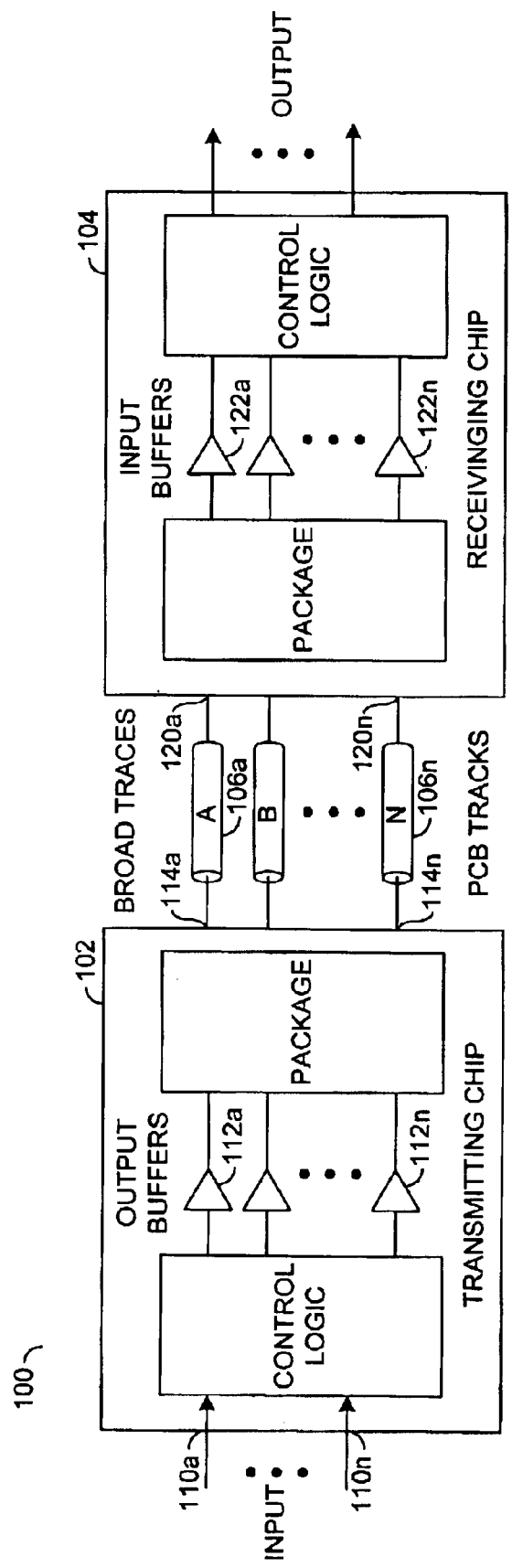
FIG. 1 is a diagram of a SSO test structure.

The test structures of the present invention are generally designed to enable the measurement of simultaneous switching noise for a wide range of input/output buffers in integrated circuits. Each structure generally allows variable number of buffers of the same type to switch simultaneously during the SSO noise measurement. Simultaneous switching may enable the relationship between the number of buffers switching and the level of simultaneous switching noise (SSO) noise at low-high and high-low transitions to be established. A typical structure comprises 10–14 switching lines, two quiet lines for ground bounce and power droop measurement, and a reference line used for delay measurement. The test structures may enable an engineer to determine the noise margin of the receivers used at low and high states. Special board structures that enable the measurement of SSO noise and noise immunity at board level may be implemented in two different topologies (i) single-chip solutions and (ii) two-chip solutions.

The SSO structures of the present invention provide a characterization and a signal integrity analysis vehicle for simultaneous switching characterization. The methodology focus may be in terms of determining the maximum number of output buffers that may be connected to the same pair of VDD/VSS without degrading the quality of the transmitted signal (e.g., causing a false pulse on a quiet line or injecting a large pulse width jitter). Ground bounce and/or power droop caused by simultaneous switching of the drivers are generally monitored. Additionally, excess incremental delay (EID) caused by simultaneous switching may also be measured. EID is an extra delay to the arrival of signals at the receiver, and is usually proportional to the SSO number. In order to enable the correlation between silicon measurement and simulation or estimation results for a wide range of I/O buffers, a maximum possible number of test structures may be incorporated in the design. The number of buffers of each type may be determined by (i) the drive strength of the buffer and (ii) the electro migration rule (EMR) for the particular technology.

Another feature of the present invention is the staggered buffer structure that enables the drivers to switch either simultaneously or with a certain delay. Delayed switching may be accomplished by dividing the SSO group into subgroups and inserting a pre-defined delay (e.g., 200 ps, 400 ps, etc.) in the data path of the subgroups. The pre-defined delay generally establishes the effectiveness of such delay in reducing the SSO noise.

Either one chip or two essentially identical chips (e.g., a transmitting chip and a receiving chip) may be used on a board for the purpose of measuring SSO noise and monitoring point-to-point communication of certain buffers such as Low Voltage Differential Swing (LVDS) buffers. Also, a wide range of frequencies (e.g., bursting) will be considered in order to cover the various buffer types included in the design. Bursting may use a bypass mode where an external high-speed data is generated and transmitted through the sending chip to the receiving chip. The noise immunity of input buffers (receivers) is also investigated. An external ramp signal with varying ramp time may be implemented The effect of narrow pulses with high amplitude on the static/dynamic noise immunity of these buffers may be investigated.

Referring to FIG. 1, a SSO test structure 100 is shown. The test structure 100 generally comprises a transmitting chip 102, a receiving chip 104 and a number of board traces 106a–106n. The test structure 100 illustrates the block diagram of the SSO structure used as an example of a test chip. The transmitting chip 102 and the receiving chip 104 have a similar implementation with the main difference being in their operation. The transmitting chip 102 may have a number of inputs 110a–110n that may be enabled to accept input signals (e.g., INPUT) from external supplies. A number of buffers 112a–112n may be configured, at the board level, for transmitting a number of signals (e.g., A–N) at a number of outputs 114a–114n. The receiving chip 104 may have a number of inputs 120a–120n that may be enabled to receive the signals A–N from the transmitting chip 102. A number of buffers 122a–122n may be configured to receive the signals. The transmitting part of the logic is not used in the receiving chip 104. Similarly, the receiving part of the logic is not generally used in the transmitting chip 102. However, an alternative single-chip solution (FIG. 7) may use the same chip for transmitting and receiving the signals A–N, as described in subsequent sections.

Figure 2:
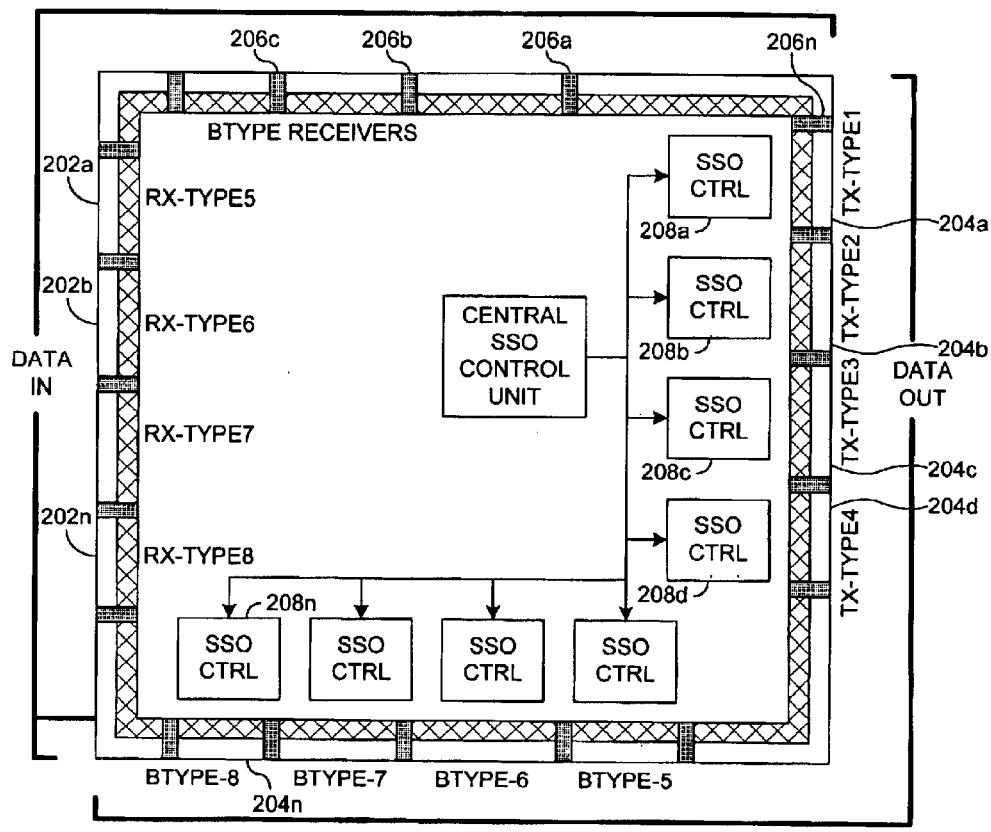
FIG. 2 is a floor plan for the test chip when the input and output buffers are placed on the periphery.

Referring to FIG. 2, a floor plan 200 for the test chip is shown. The floor plan 200 illustrates input buffers 202a–202n (labeled Rx-type and B-type) and output buffers 204a–204n (labeled Tx-type and B-type) placed on the periphery. The output buffers 204a–204n (transmit and bidirectional set to transmit) are generally shown on the right and bottom sides. The input buffers 202a–202n (receive and bidirectional set to receive) are generally placed on the left and top sides. Each buffer type (or SSO group) may be electrically separated by power cuts 206a–x in power and ground traces to provide isolation from other buffers in order. Such isolation generally prevents coupling or cross talk effects from neighboring groups. Also, each SSO group generally has a separate controller 208a–n to select the number of simultaneously switching buffers during measurement. A central control unit 210 enables individual groups to switch independently during SSO measurements.

A transmitting chip 200 comprises a number of SSO structures, one per buffer type, each containing a control logic (to be described in connection with FIG. 3) and a number of buffers. In one example, 10–16 buffers may be implemented. However, the particular number of buffers may be varied to meet the design criteria of a particular implementation. The control logic 208a–n generally enables the user to select a different number of buffers to switch simultaneously during the measurement. In one example, 8–14 buffers are generally allowed to switch simultaneously, allowing two quiet lines to always be permanently connected to ground and power. The two quiet lines may be used for measuring ground bounce and power droop, respectively. Thus, for N lines buffer type, there may be N-2 switching lines and 2 lines for measurement.

Figure 3:
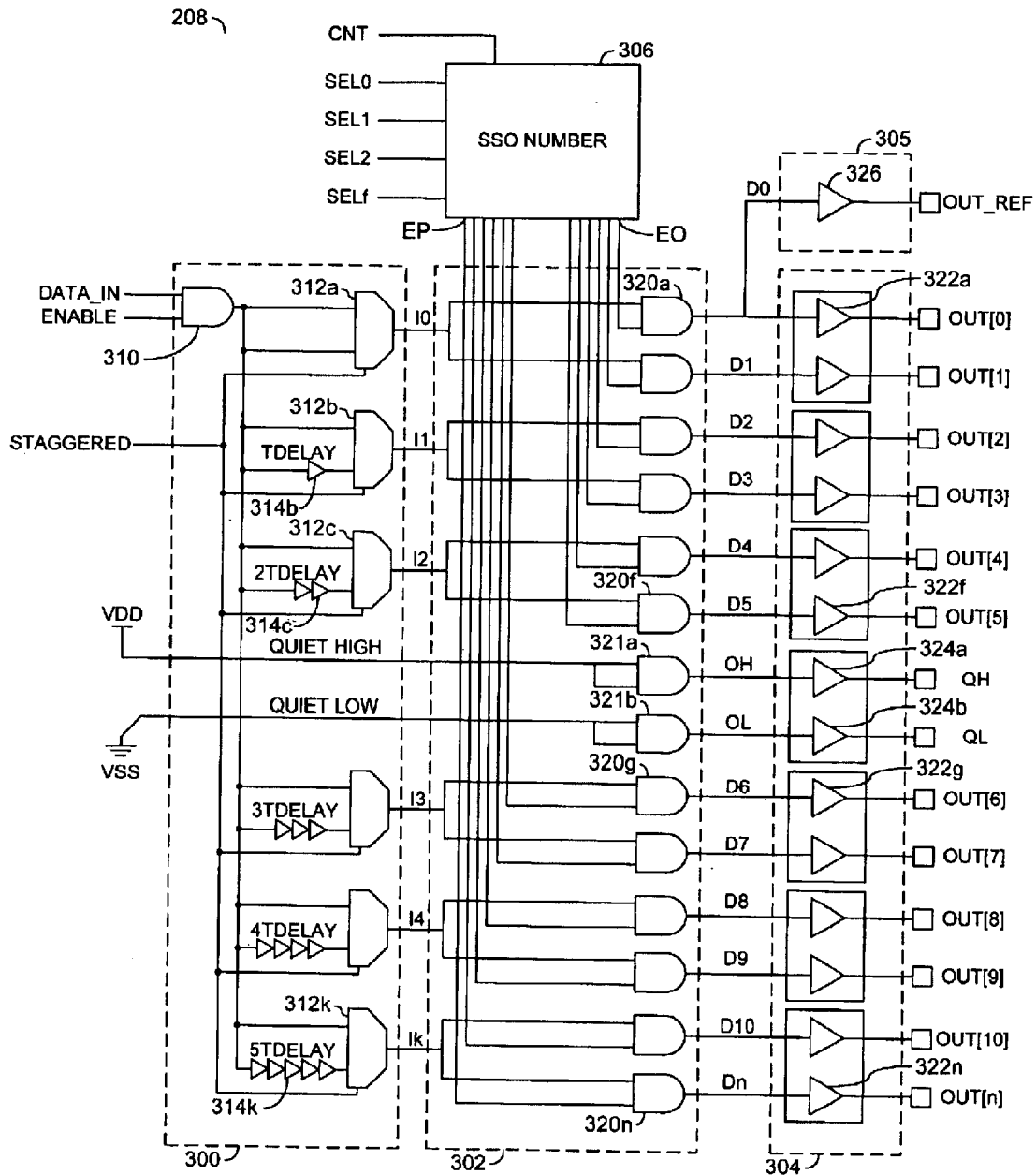
FIG. 3 is an example illustrating staggered and non-staggered I/Os.

Referring to FIG. 3, a block diagram illustrating a controller circuit 208 in the transmitting block of the chip 200 is shown. The controller circuit 208 generally comprises a circuit or block 300, a circuit or block 302, a circuit or block 304 and a circuit or block 306. The circuit 300 may receive a data signal (e.g., DATA_IN), an enable signal (e.g., ENABLE) and a stagger signal (e.g., STAGGERED). The circuit 300 may also have a direct or clean connection to a high power supply and a lower power supply to receive a high power voltage signal (e.g., VDD) and a low power voltage signal (e.g., VSS), respectively. The circuit 300 may generate a number of intermediate signals (e.g., I0–Ik) that may be received by the circuit 302. The circuit 300 may also generate a high signal (e.g., QUIET_HIGH) and a low signal (e.g., QUIET_LOW) that may be received by the circuit 302.

The circuit 302 may receive the intermediate signals I0–Ik, QUIET_HIGH and QUIET_LOW from the circuit 300. The circuit 302 may also receive multiple enable signals (e.g., E0–Ep) from the circuit 306. The circuit 302 may generate multiple drive signals (e.g., D0–Dn) that may be received by the circuit 304. The circuit 302 may also generate multiple drive signals (e.g., DH and DL) that may be received by the circuit 304.

The circuit 304 may generate multiple output signals (e.g., OUT[0]–OUT[n]) at a transmit interface 305 based upon the intermediate signals I0–Ik and the associated enable signals E0–Ep. The circuit 304 may also generate a reference quiet high signal (e.g., QH) and a reference quite low signal (e.g., QL) base upon the drive signals DH and DL, respectively. Another reference signal (e.g., OUT_REF) may also be generated by the circuit 304 using a first drive signal D0.

The circuit 306 may receive a control signal (e.g., CNT). The circuit 306 may also receive multiple select signals (e.g., SEL0–SELf). The control signal CNT and the select signals SEL0–SELf may be used to determine generation of the enable signals E0–Ep in a logical high (e.g., enabled) or a logical low (e.g., disabled) state.

The circuit 300 generally comprises a logic gate 310, multiple multiplexers 312a–312k and multiple delay circuits 314b–k. The logic gate 310 may generate a signal (e.g., IN) in an enabled/disabled state by logically ANDing the data signal DATA_IN with the enable signal ENABLE. The signal IN may be received by an input of each multiplexer 312a–k and each delay circuit 314b–k. A delayed version of the signal IN generated by each delay circuit 314b–k may be received at a second input of each multiplexer 312b–k. The first multiplexer 312a may receive the signal IN at the second input without being delayed (e.g., a common delay). Addressing of the multiplexers 312a–k may be provided by the signal STAGGERED. Each of the delay circuits 314b–k may be implemented to generate one of a plurality of delays determined by the signal STAGGERED.

The circuit 302 generally comprises multiple logic gates 320a–n and two logic gates 321a–b. Each logic gate 320a–n may generate a drive signal D0–Dn by logically ANDing or gating the intermediate signals I0–Ik with a respective enable signal E0–Ep. The two logic circuits 321a–b may generate the drive signals DH and DL by buffering the intermediate signals QUIET_HIGH and QUIET_LOW through AND logic gates 321a–b.

SEL0–SELf. While the control signal CNT is in the logical low state, all of the enable signals E0–Ep may be held in the logical low state regardless of the select signals E0–Ep.

The selector circuit 306 may be configured to provide full control on the individual buffers 322a–n. In one example, any number of SSO from 1 to 16 may be contemplated, as illustrated in the following TABLE 1:

TABLE 1

| input    | output enable E |   |   |   |   |   |   |   |   |   |    |    |    |    |    |    |
|----------|---|---|---|---|---|---|---|---|---|---|----|----|----|----|----|----|
| sel (3:0)| 0 | 1 | 2 | 3 | 4 | 5 | 6 | 7 | 8 | 9 | 10 | 11 | 12 | 13 | 14 | 15 |
| 0000     | 1 | 1 | 1 | 1 | 1 | 1 | 1 | 1 | 1 | 1 | 1  | 1  | 1  | 1  | 1  | 1  |
| 0001     | 1 | 1 | 1 | 1 | 1 | 1 | 1 | 1 | 1 | 1 | 1  | 1  | 1  | 1  | 1  | 0  |
| 0010     | 1 | 1 | 1 | 1 | 1 | 1 | 1 | 1 | 1 | 1 | 1  | 0  | 1  | 1  | 1  | 0  |
| .        | . | . | . | . | . | . | . | . | . | . | .  | .  | .  | .  | .  | .  |
| .        | . | . | . | . | . | . | . | . | . | . | .  | .  | .  | .  | .  | .  |
| 1111     | 1 | 0 | 0 | 0 | 0 | 0 | 0 | 0 | 0 | 0 | 0  | 0  | 0  | 0  | 0  | 0  |

The circuit 304 generally comprises multiple buffer circuits 322a–n, two buffer circuit 324a–b, and a buffer circuit 326. Each buffer circuit 322a–n may buffer a drive signal D0–Dn to generate the output signals OUT[0]–OUT[n]. The buffer circuits 324a–b may be driven by the drive signals DH and DL to generate the output signals QH and QL, respectively. The buffer circuit 326 may generate the reference signal OUT_REF by buffering the first drive signal D0. The buffer 326 is generally connected to independent power and ground supplies in order to facilitate the measurement of Excess Incremental delay (EID). In particular, the circuit 326 is supplied by an independent VDD/VSS and does not share the same power and ground with the buffer circuits 322a–n, as shown in FIG. 3.

The circuit 306 may be implemented as an SSO number selector circuit 306. The SSO number selector circuit 306 may be used to control the switching buffers 322a–n. The circuit 208 may be implemented with single-ended buffers 302a–n. For differential buffers 322a–n, 324a–b and 326, the same structure may be applied with double the number of signal lines (e.g., OUT[0]+, OUT[0]–, OUT[1]+, OUT[1]–, . . . , OUT[n]+, OUT[n]–). The number of switching buffers 322a–n may easily be extended for larger structures. However, if a larger number of the buffers 322a–n is implemented for a particular design, the number of selection control signals SEL0–SELf may be increased accordingly. In one example, the SSO number selector 306 may be implemented as a simple demultiplexer with a single control input signal CNT, four control signals SEL[0:3] and 16 output signals E0–E15, with each output signal E0–E15 used as an enable signal for one of the output buffers 322a–n. However, the number of inputs, control signals and outputs may be varied to meet the design criteria of a particular implementation.

Figure 4:
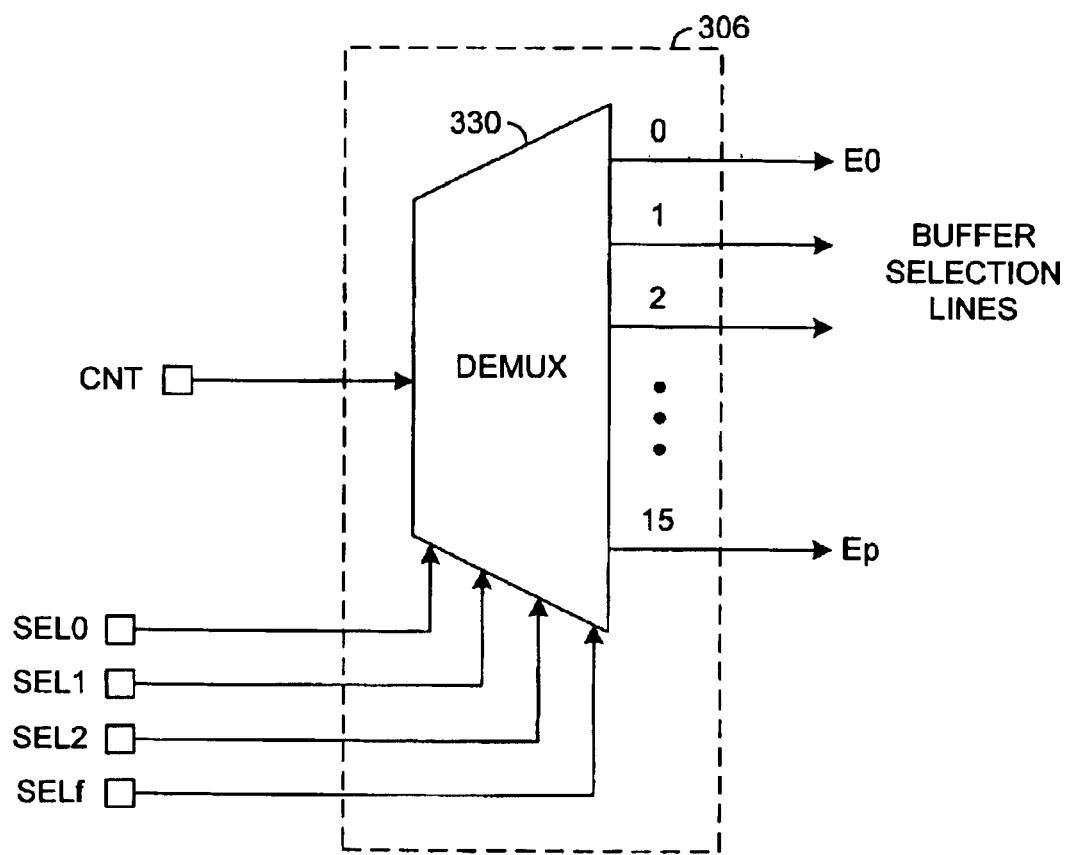
FIG. 4 is a diagram illustrating an SSO number selector.

FIG. 4 illustrates a more detailed diagram of the SSO number selector circuit 306. The SSO number selector circuit 306 generally comprises a demultiplexer 330. The demultiplexer 330 generally receives the control signal CNT to enable/disable all of the enable signals E0–Ep. While the control signal CNT is in a logical high or enabled state, each enable signal E0–Ep may be controllable to either the logical high state or the logical low state by the select signals Other arrangements of the SSO number selector circuit 306 may be implemented to meet the criterial of a particular application. For example, the number of select signals SEL0–SELf may be expanded such that $2^N$ possible logic state combinations of the enables signals E0–Ep may be generated.

SSO noise may be caused by simultaneous switching of a number of drivers buffers 322a–n and 324a–b that share the same power and ground supplies. A technique to reduce the effect of SSO noise is to spread the switching over a time window to reduce the amplitude of the SSO noise. The present invention may advantageously use this effect to divide the SSO group into a number of subgroups and then insert different delays (e.g., delay circuits 314b–k) in the data path of each of the subgroups. For example, 12 buffers 322a–n may be divided into 6 switching groups and one quite group (each comprising 2 buffers 324a–b). The first group may be implemented without a delay. The second group may be implemented having T delay, where T is a predetermined unit of delay. The third group may be implemented having 2T delay. Further groups may add further delays. Using the 6 group example, the last buffer group may have a total delay of 5T. Therefore, the switching may be spread over a period of 5T. In an example when T is 200 ps, the data will be staggered over a period of 1 ns. However, the particular increment of T may be varied to meet the design criteria of a particular implementation. There is no delay needed in the quiet group.

An example of staggered and non-staggered I/Os is shown in FIG. 3. Each buffer family requires two quiet lines used for measurement of ground bounce and power droop. The quiet lines may be labeled as the signal quiet Low (e.g., QL) and the signal quiet High (e.g., QH), depending on the input data. The signal QL will generally have logic 0 input whereas the signal QH generally has logic 1 input. Both of the quiet lines are preferably placed in the physical middle of the SSO group so that the maximum coupling effect may be observed.

Figure 5:
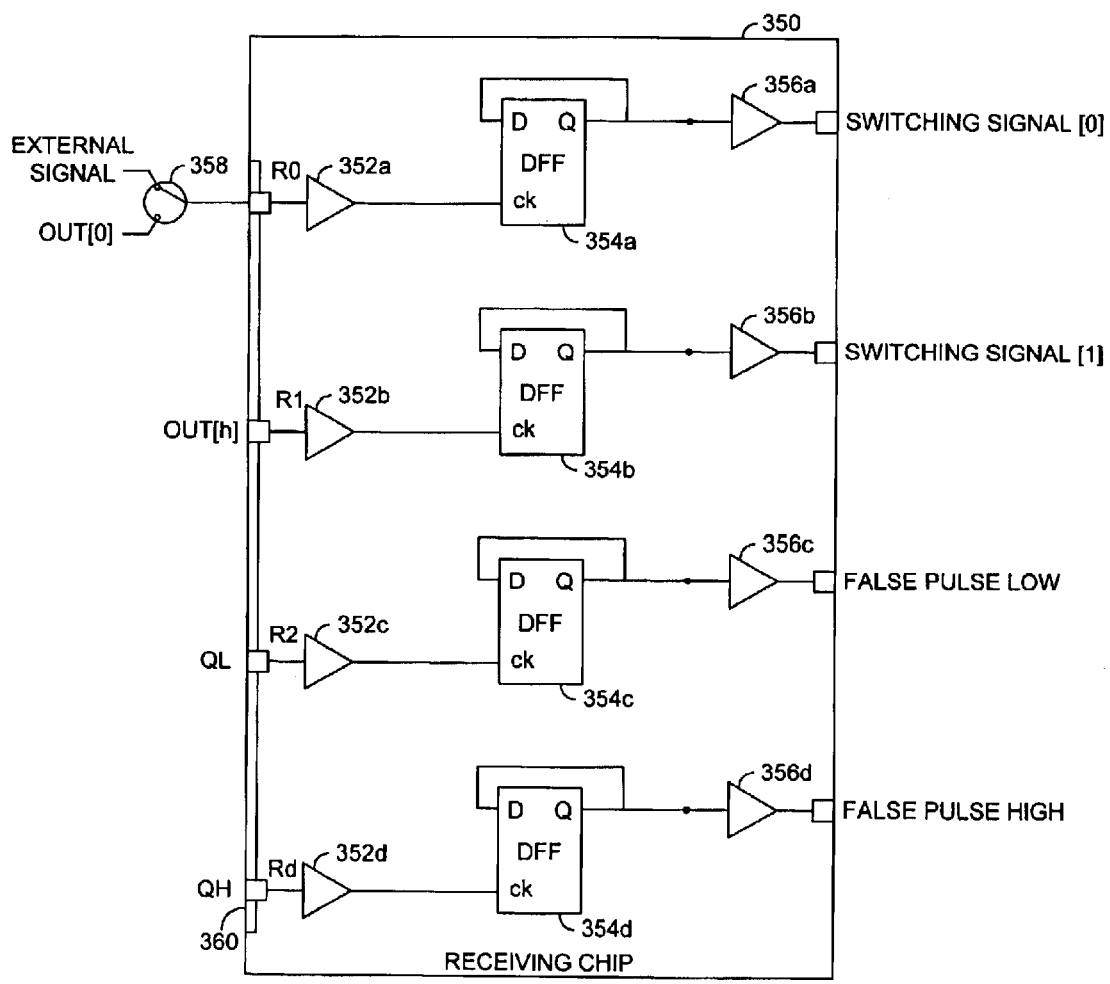
FIG. 5 is a block diagram illustrating a receiving chip.

Although the transmitting and receiving chips may be implemented essentially the same, various blocks in the design may be configured differently depending on whether the chip is placed in the transmitting or receiving position on a test board. A block diagram of a receiving circuit 350 is illustrated in detail in connection with FIG. 5. The receiving circuit 350 generally comprises multiple receive buffers 352a–d, multiple flip-flops 354a–d and multiple buffers 356a–d. An switch 358 may be included within the receiving chip 350 or external to the chip 350, as illustrated. Each receive buffer 352a–d may be connected to a receive interface 360 of the circuit 350 to receive input signals (e.g., R0–Rd). The buffers 356a–d may drive monitoring equipment (not shown) used to test the switching noise.

The switch 358 may generate the first input signal R0 by switching between a signal (e.g., OUT[0]) and an external signal (e.g., EXTERNAL). The signal EXTERNAL may be a ramp signal used to test a sensitivity of the receive buffers 352a–d. The first input signal R0 may be received by the buffer 352a. The flip-flop 354a, set to an initial logic state, may toggle to a final state on an edge of the input signal R0. Thereafter, the flip-flop 354a may remain in the final logic state regardless of any additional transition edges of the input signal R0. The buffer 356a may generate a signal (e.g., SWITCHING_SIGNAL[0]) by buffering a signal at a Q output of the flip-flop 354a.

A second input signal (e.g., R1=OUT[h], where $1 \leq h \leq n$) may be received by the buffer 352b directly at the receive interface 360. The flip-flop 354b, set to an initial state, may toggle to a final state upon detecting an edge in the input signal R1. The flip-flop 354b may be configured to remain in the final state regardless of any subsequent transitions of the input signal R1. The buffer 356b may generate a signal (e.g., SWITCHING_SIGNAL[1]) by buffering a signal at the Q output of the flip-flop 354b.

A third input signal (e.g., R2=QL) may be received by the buffer 352c through the receive interface 360. The flip-flop 354c, set to an initial state, may toggle to a final state if an edge is detected in the input signal R2. The buffer 356c may generate a signal (e.g., FALSE_PULSE_LOW) in an asserted state if the flip-flop 356c changes from the initial state to the final state. Otherwise, the buffer 356c may hold the signal FALSE_PULSE_LOW in a de-asserted state.

A fourth input signal (e.g., R3–QH) may be received at the receive interface 360 by the buffer 354d. The flip-flop 354d is set to an initial state and may toggle to a final state if an edge is detected in the input signal R3. The buffer 356d may generate a signal (e.g., FALSE_PULSE_HIGH) in an asserted state if the flip-flop 356d changes from the initial state to the final state. While the flip-flop 356d remains in the initial state, the buffer 356d may generate the signal FALSE_PULSE_HIGH de-asserted. Additional input signals may be sampled and reported using additional buffers 352, flip-flops 354 and buffers 356.

Figure 6:
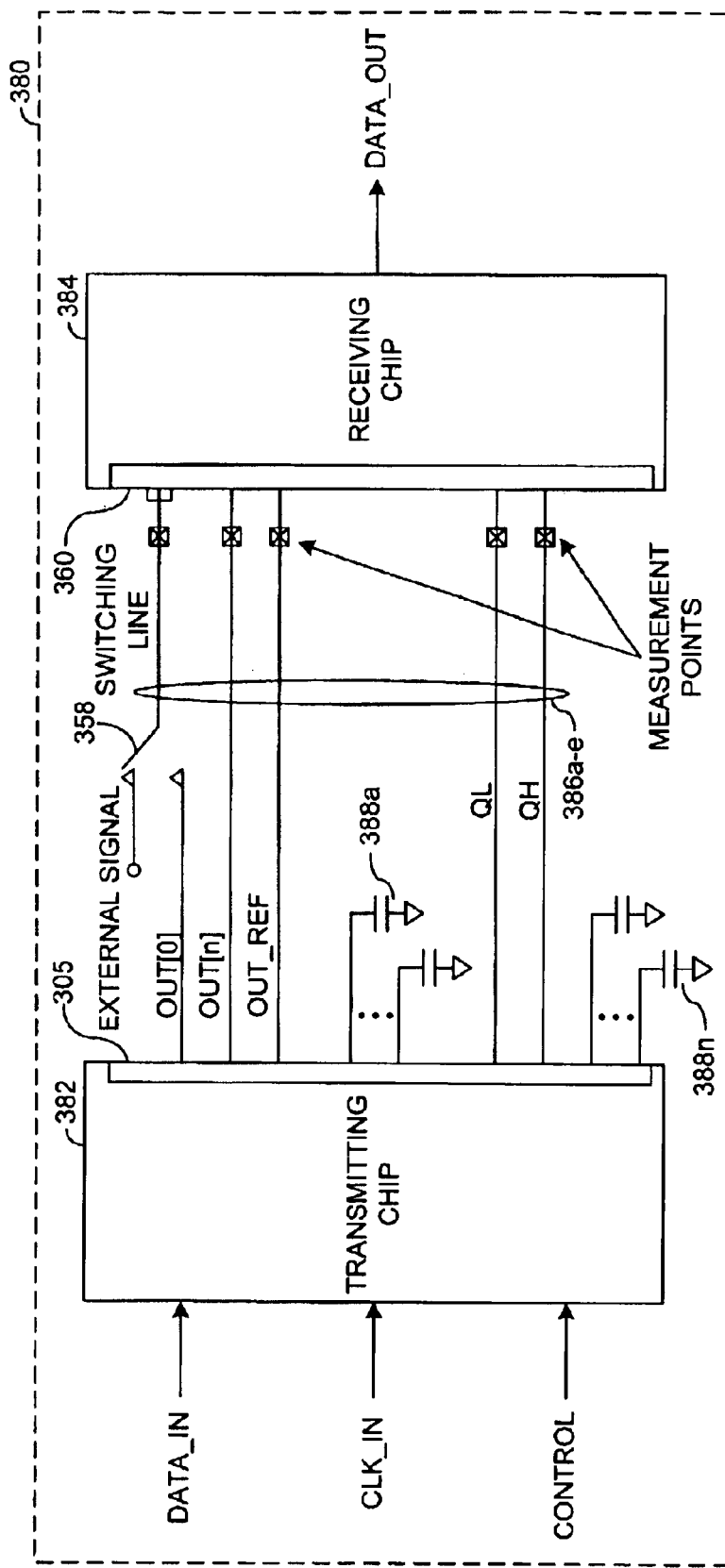
FIG. 6 is a block diagram of a 2-chip test board.

Referring to FIG. 6, a block diagram of a 2-chip apparatus or test board 380 is illustrated. The test board 380 generally comprises a transmitting chip 382 connected to a receiving chip 384 through multiple traces 386a–e. The transmitting chip 382 may include one or more SSO circuits 280 and one or more receive circuits 350. The switch 358 may be included on the test board 380 in a first or second trace 386a or 386b between the transmitting chip 382 and the receiving chip 384. Generally, only two switching lines (e.g., for signals OUT[0] and OUT[h]), two quiet lines (e.g., for signals QH and QL) and an optional line (e.g., for signal OUT_REF) may actually be connected between a transmitting chip 382 and a receiving chip 384 on the board 380 for each buffer type. The rest of output signals OUT[1]–OUT[n] of the transmitting chip 382 may be terminated with capacitors 388a–m near the transmitting chip 382 in order to reduce congestions and to save space on the test board 380.

The receiving chip 384 generally comprises a number of input buffers 352, control logic 354 and output buffers 356 to drive some of the signals (e.g., DATA_OUT) for monitoring.

The first receiving line may also be used for measuring a noise immunity of the input buffer used in each SSO group. Therefore, the external switch 358 may be inserted on a line such that an external ramp or increased step signal may be applied at the receiver input 360 to determine a noise margin. During SSO measurement, the switch 358 is generally set to the other position such that the output buffer 322 and input buffers 352 may be connected directly.

Figure 7:
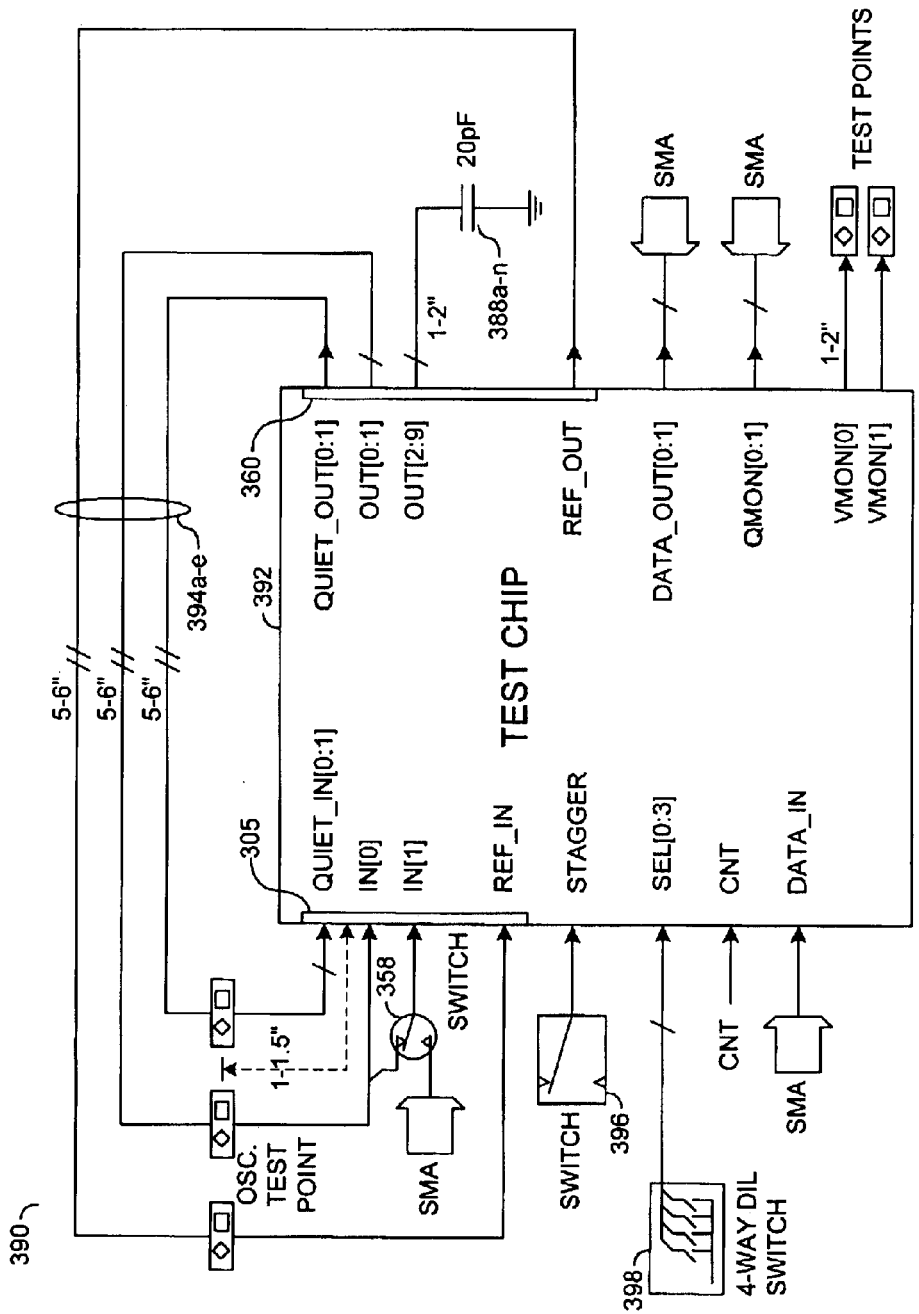
FIG. 7 is a diagram illustrating an embodiment of the present invention.

Referring to FIG. 7, a block diagram of a 1-chip apparatus or test board 390 is illustrated. The test board 390 generally includes a signal test chip 392, multiple trace lines 394a–e, the switch 358, a second switch 396, a multi-way dual-inline switch 396 and the capacitors 388a–m. The test chip 392 generally includes one or more circuits 208 and one or more receive circuits 350. The trace lines 392a–e may connect several of the output signals OUT[0]–OUT [n] from the transmit interface 305 to the receive interface 360. The switch 396 may generate the signal STAGGER. The switches 398 may generate the select signal SEL[0:3]. The signal DATA_OUT[0:1] may include the signals SWITCHING_SIGNAL[0] and SWITCHING_SIGNAL [1]. The signal QMON[0:1] may include the signals FALSE_PULSE_LOW, and FALSE_PULSE_HIGH. The high and low power supply voltages, as measured from inside the test chip 392, may be presented in a voltage monitoring signal (e.g., VMON[0:1]).

Any packaging for the transmitting chip 382(392) and/or the receiving chip 384(392) may be used with the test structures described. However, where two or more packages may be used with the same design, the performance impact of the packages from the SSO noise and coupling standpoints may also be analyzed. Use of a common package design generally offers a cost effective solution to the package performance analysis and evaluation. The same test structures may be used to evaluate and compare packages with multiple power and ground planes in order to quantify the effectiveness of these planes. Finally, placing essentially identical SSO structures at the center and corner of the package could give a good insight into the parasitic distribution of the signal traces in wire bond packages.

The on-chip SSO test structures described generally implement a certain topology at the board level to complement the structures and to facilitate various types of measurement. Two board topologies are generally presented illustrating a two-chip (e.g., FIG. 6) and a one-chip (e.g., FIG. 7) solution. The main difference between these topologies is that in the two-chip design, the board 380 may contain two essentially identical chips 382 and 384 that may be configured as a transmitter and receiver, respectively. In the one-chip design, the same chip 392 may be used as the transmitter and the receiver, which may be implemented with minor changes to enable both the input and output buffers in the same time.

The two signal lines, quiet lines and reference line in each SSO group may have generally equal lengths in order to achieve high accuracy in measurement. The other switching lines in each SSO group are generally terminated by suitable load capacitors 388a–m to ground near the drivers to avoid congestion and to reduce the board size.

The test points 394a–c may be placed as close as possible to the input buffers such that the noise level measured will be similar to the noise seen by the receiver. The board may allow the user to control which SSO group is enabled, number of buffers switching in the SSO group, and whether SSO noise or noise immunity measurement is to be conducted. User control may be achieved through external switches that may be controlled manually. Additionally, inverters (not shown) may be added to change a particular polarity of the signals.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a first circuit configured to generate a plurality of intermediate signals from a data signal, each of said intermediate signals switchable between (i) a common delay and (ii) one of a plurality of staggered delays determined by a stagger signal;
   a second circuit configured to generate a plurality of first drive signals by gating said intermediate signals with a plurality of enable signals; and
   a third circuit configured to generate a plurality of first output signals at a transmit interface of a chip by buffering said first drive signals.

2. The apparatus according to claim 1, further comprising:
   a fourth circuit configured to generate said enable signals in response to a control signal and a plurality of enable signals.

3. The apparatus according to claim 1, wherein said second circuit is further configure to:
   generate a high drive signal by buffering a high power voltage; and
   generate a low drive signal by buffering a low power voltage, wherein said high power voltage and said low power voltage are configured to provide a noise free measurement of said apparatus.

4. The apparatus according to claim 3, wherein said third circuit is further configured to:
   generate a high output signal at said transmit interface by buffering said high drive signal; and
   generate a low output signal at said transmit interface by buffering said low drive signal.

5. The apparatus according to claim 1, wherein said second circuit is further configured to:
   generate a plurality of second drive signals by gating said intermediate signals with said enable signals.

6. The apparatus according to claim 5, wherein said third circuit is further configured to:
   generate a plurality of second output signals by buffering said second drive signals.

7. The apparatus according to claim 1, further comprising:
   a receive circuit configured to generate a first signal by sensing a transition of an input signal received at a receive interface of said chip.

8. The apparatus according to claim 7, wherein said receive circuit is further configured to:
   hold said first signal at a predetermined state independent of said input signal after sensing said transition.

9. The apparatus according to claim 7, further comprising:
   a switch disposed between said transmit interface and said receive interface to generate said input signal by switching one of (i) a test signal and (ii) one of said output signals.

10. The apparatus according to claim 9, wherein:
    second circuit is further configure to (i) generate a high drive signal by buffering a high power voltage and (ii) generate a low drive signal by buffering a low power voltage;
    said third circuit is further configured to (iii) generate a high output signal at said transmit interface by buffering said high drive signal, (iv) generate a low output signal at a transmit interface of said chip by buffering said low drive signal and (v) generate a reference output signal by buffering one of said first drive signals; and
    said receive circuit is further configured to (vi) generate a second signal by sensing a transition of said high output signal, (vii) generate a third signal by sensing a transition of said low output signal and (viii) generate a fourth signal by sensing a transition of said reference signal.

11. A method for operating a circuit comprising the steps of:
    (A) generating a plurality of intermediate signals from a data signal, each of said intermediate signals switchable between (i) a common delay and (ii) one of a plurality of staggered delays determined by a stagger signal;
    (B) generating a plurality of first drive signals by gating said intermediate signals with a plurality of enable signals; and
    (C) generating a plurality of first output signals at a transmit interface of said circuit by buffering said first drive signals.

12. The method according to claim 11, further comprising the step of:
    generating said enable signals in response to a control signal with a plurality of enable signals.

13. The method according to claim 11, further comprising the step of:
    generating a plurality of second drive signals by gating said plurality of intermediate signals with said enable signals.

14. The method according to claim 13, further comprising the step of generating a plurality of second output signals at said transmit interface by buffering said second drive signals.

15. The method according to claim 11, further comprising the step of:
    generating a high output signal at said transmit interface by buffering a high power voltage.

16. The method according to claim 15, further comprising the step of:
    generating a low output signal at said transmit by buffering a lower power voltage.

17. The method according to claim 11, further comprising the step of:
    generating a signal by sensing a transition of an input signal received at a receive interface of said circuit.

18. The method according to claim 17, further comprising the step of:
    generating said input signal by switching between a test signal generated external to said circuit and one of said output signals.

19. The method according to claim 18, further comprising the step of:

holding said signal at a predetermined state independent of said input signal after sensing said transition.

20. A circuit comprising:

means for generating a plurality of intermediate signals from a data signal, each of said intermediate signals switchable between (i) a common delay and (ii) one of a plurality of different staggered delays determined by a stagger signal;

means for generating a plurality of first drive signals by gating said intermediate signals with a plurality of enable signals; and means for generating a plurality of first output signals at a transmit interface by buffering said first drive signals.

* * * * *